United States Patent
Yadollahi

(10) Patent No.: US 8,602,464 B2
(45) Date of Patent: Dec. 10, 2013

(54) DECOMPRESSION VENT LATCHING MECHANISM

(75) Inventor: Morteza Yadollahi, Irvine, CA (US)

(73) Assignee: Adams Rite Aerospace, Inc., Fullerton, CA (US)

( * ) Notice: Subject to any disclaimer, the term of this patent is extended or adjusted under 35 U.S.C. 154(b) by 922 days.

(21) Appl. No.: 12/264,150

(22) Filed: Nov. 3, 2008

(65) Prior Publication Data

US 2009/0118876 A1    May 7, 2009

Related U.S. Application Data

(60) Provisional application No. 60/984,618, filed on Nov. 1, 2007.

(51) Int. Cl.
*E05C 3/02* (2006.01)

(52) U.S. Cl.
USPC ............... 292/194; 292/44; 292/49; 292/219

(58) Field of Classification Search
USPC ........................................................ 292/194
See application file for complete search history.

(56) References Cited

U.S. PATENT DOCUMENTS

| | | | | |
|---|---|---|---|---|
| 4,230,352 A * | 10/1980 | Sealey et al. | ............. | 292/341.17 |
| 5,735,487 A | 4/1998 | Abild et al. | | |
| 6,513,841 B1 * | 2/2003 | Jackson | ......................... | 292/214 |
| 6,866,226 B2 * | 3/2005 | Pratt et al. | .................. | 244/129.4 |
| 6,866,227 B2 * | 3/2005 | Pratt et al. | .................. | 244/129.4 |
| 6,902,137 B2 * | 6/2005 | Brzeski et al. | ............. | 244/129.5 |
| 7,255,376 B2 * | 8/2007 | Pratt et al. | ..................... | 292/201 |
| 2003/0052227 A1 * | 3/2003 | Pittman | ...................... | 244/118.5 |
| 2004/0094670 A1 * | 5/2004 | Pratt et al. | .................. | 244/129.4 |
| 2007/0158955 A1 * | 7/2007 | Homner | ......................... | 292/202 |
| 2010/0320318 A1 * | 12/2010 | Roth et al. | ................. | 244/118.5 |

FOREIGN PATENT DOCUMENTS

WO        03029585 A2       4/2003

* cited by examiner

*Primary Examiner* — Carlos Lugo
*Assistant Examiner* — Mark Williams
(74) *Attorney, Agent, or Firm* — Baker & Hostetler LLP

(57) ABSTRACT

A decompression vent latching apparatus, includes a flap placed on a door opening to a first area from a second area, a housing fastened to the flap on the door, a plunger mounted within the housing, having rotational and lateral movement within the housing, a stop block connected to the plunger, a pair of tip blocks having movement restricted by the stop block connected to the plunger when contacting the stop block, the tip blocks being controlled to be a predetermined distance away from the stop block, and a locking unit connected to the pair of tip blocks providing a closed or open position.

12 Claims, 6 Drawing Sheets

DECOMPRESSION VENT LATCHING MECHANISM

CROSS REFERENCE TO RELATED APPLICATIONS

This application claims priority from U.S. Provisional Patent Application 60/984,618 filed Nov. 1, 2007, the entire contents of which is incorporated herein in its entirety.

TECHNICAL FIELD

The present invention relates to access apparatus e.g., aperture openers, door or window openers, and more specifically, to access apparatus that opens an access device, e.g., a door or window or flap or the like, upon a pressure difference between opposite sides of the access device.

BACKGROUND OF THE DISCLOSURE

Passenger aircraft are generally equipped with cockpit doors. The cockpit door provides security and privacy for the pilot, copilot or flight crew. It is noted that the term cockpit refers to the portion of the aircraft where the pilot, copilot or flight crew sit, this is also known as the flight deck. This is distinguished from the cabin which refers to the portion of the aircraft where passengers sit.

In many aircraft, it is required that the ambient air pressure in the cockpit be generally the same as the ambient air pressure in the passenger cabin of the aircraft. A dangerous situation may arise if there is a sufficiently great pressure difference between opposite sides of the cockpit door or any compartments separated by a partition within the aircraft. A pressure difference can cause structural deformation and lead to the loss of the aircraft.

As such, there is a need to provide an apparatus and method of decompression vent latching mechanism that is efficient to implement and use and easy to manufacture. Further, there is a need to have an apparatus that can open an access device upon a pressure difference efficiently since the current apparatus require extensive effort to implement or do not provide adequate operation.

SUMMARY OF THE DISCLOSURE

The foregoing needs are met, to a great extent, by the present invention, wherein in one aspect an apparatus is provided that in some embodiments, the present invention provides an access apparatus that opens an access device upon a pressure difference between opposite sides of an access device or partition.

In accordance with a preferred embodiment, there is at least one access device or partition that includes an openable aperture element in the form of a door, or window, or flap or the like and an access apparatus which is functional to and adapted to open the openable element in the presence of a pressure difference of a predefined magnitude between opposite sides of the access device or partition.

In one aspect of the disclosure, a decompression vent latching apparatus, includes a flap placed on a door opening to a first area from a second area, a housing fastened to the flap on the door, a plunger mounted within the housing, having rotational and lateral movement within the housing, a stop block connected to the plunger, a pair of tip blocks having movement restricted by the stop block connected to the plunger, the tip blocks being controlled to be a predetermined distance away from the stop block, and a locking unit connected to the pair of tip blocks providing a closed or open position.

The tip blocks can each include a rounded surface at the end facing the stop block. The stop block can include a rounded surface at the end facing the tip blocks. The tapered surface can also be on both the end facing the tip blocks and the end away from the tip blocks. A cover plate can be disposed on the bottom of the housing facing the flap, extending over the flap to provide a vent channel in the cover plate. A resilient member can be disposed between the armor plate and the flap. The plunger can move in at least two directions to move the stop block away from the tip blocks to provide a second open position. There can be resilient members connected to the tip blocks and being compressed when there is movement in the latch or when the tip block is in contact with the stop block. The cover plate can include a material resistant to ballistic penetration of at least NIJ level IIIA. The plunger can be loaded with a resilient member providing only mechanical operation. The status indicator can be connected to the housing and indicating whether the apparatus is in an open or closed position and viewable from outside of the apparatus.

In another aspect of the disclosure, a method of a decompression vent latching mechanism, includes disposing a flap on a door that closes a first area from a second area, setting cam hooks by moving an arm roller slot and pushing the cam hooks in a locked position, moving a plunger toward the first area, opening a path for at least two tip blocks adjacent to the plunger, and pushing the flap towards the first area by pressure on a second area when force on the flap is greater than the holding force of both latches of the tip blocks, opening the flap to the first area. The mechanism can include controlling the distance between the top block and stop block to be a predetermined controlled distance preventing collision of the stop block with the tip blocks during decompression of the first area.

In another aspect of the disclosure, a decompression vent latching apparatus includes a flap means placed on a door, a housing means fastened to the flap means on the door, a piston means mounted within the housing means having rotation and lateral movement within the housing means, a stop block connected to the piston means, and a tip block means having movement restricted the stop block connected to the piston means, the tip block means being controlled to be a predetermined distance away from the stop block.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

DETAILED DESCRIPTION

The decompression latching mechanism (DVLM) of the present disclosure is a pressure control latching device access apparatus which is designed to rapidly (e.g., time<200 msec) open a flap (panel located in the cockpit door or other aircraft partition) in an event of a sudden cabin decompression (e.g., ΔP of 30 to 40 mbar) in an Aircraft or other moving type vehicle. It is also designed to open the flap for emergency evacuation of the cockpit crew. When the flap is located in the cockpit door, it allows a secondary exit for the cockpit crew.

Figure 1:
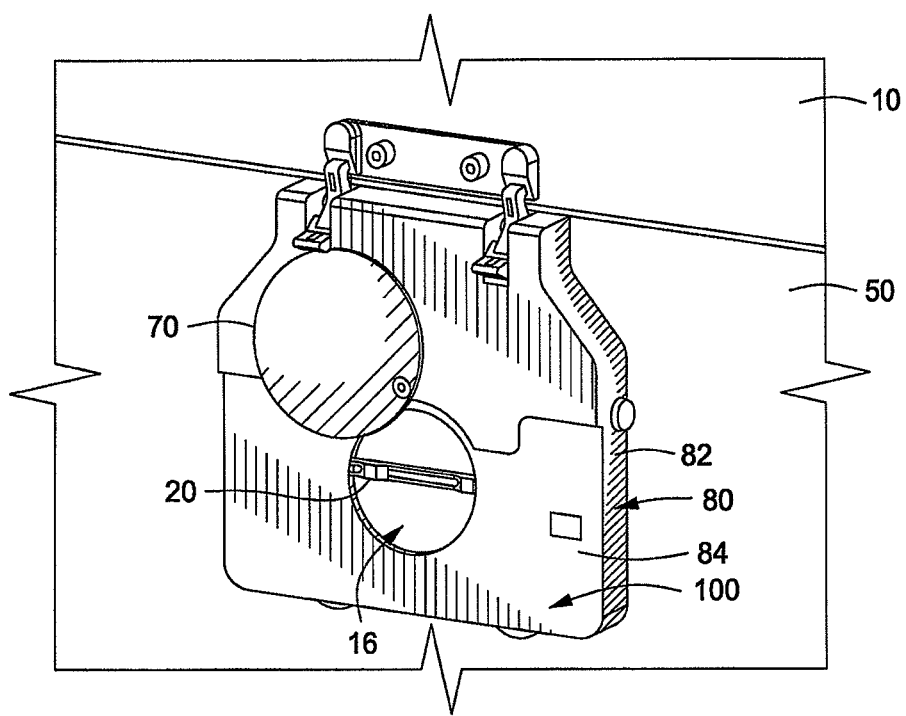
FIG. 1 is a front view of the decompression latching mechanism (DVLM).

Referring to FIG. 1, a view of the decompression latching mechanism (DVLM) 100 is shown attached to a door 10 and flap 50. The DVLM 100 can be attached to any other type of moveable object or moveable partition means that provides entry from one area to another, and is not limited to being attached to a door 10. For example, the DVLM 100 can be attached also to a window and control access accordingly.

Access to the internal parts can be quickly obtained through an access panel 70 that is moveable. The opening in the DVLM 100 can expose parts such as a plunger 16 and a stop bar 20 attached to the plunger 16. A user can therefore manipulate the plunger 16 in a manner such as pressing or rotating. Other parts of the DVLM may also be accessible or closed for access, depending on the parts that are allowed to be accessed and manipulated manually.

Figure 2:
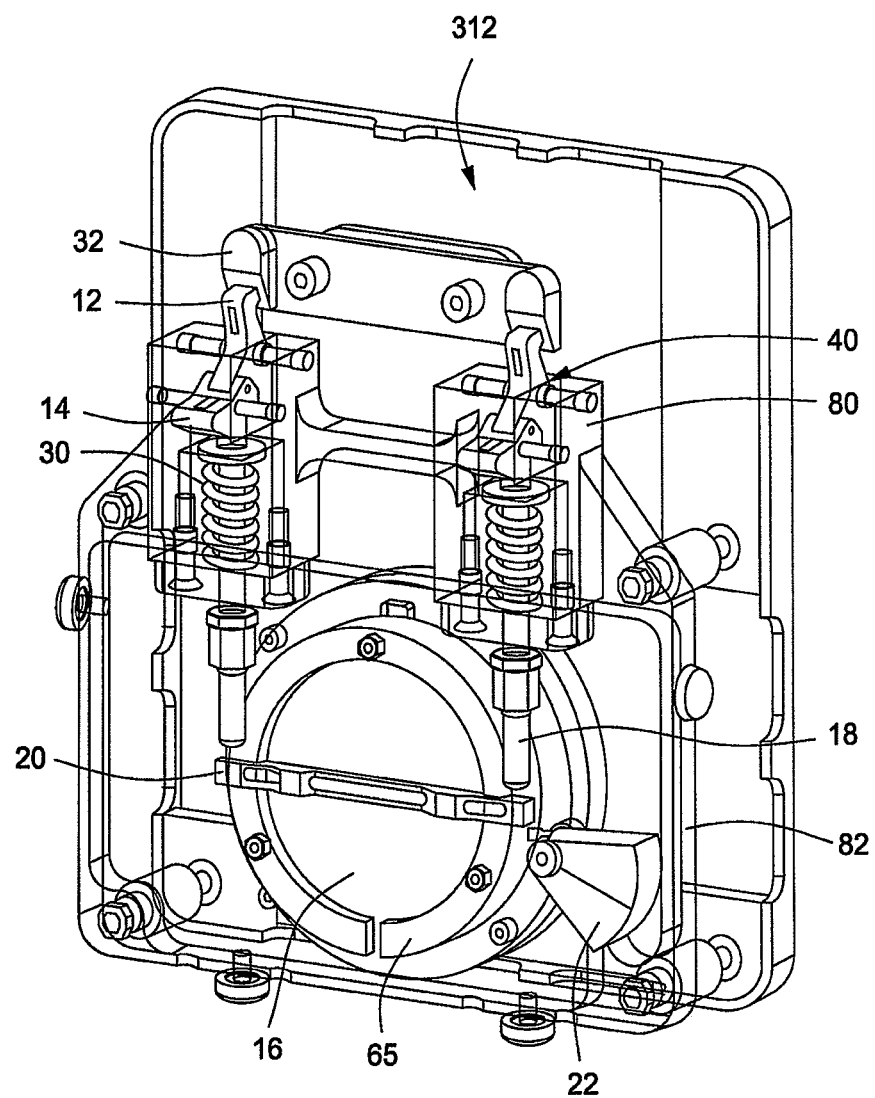
FIG. 2 is an illustration of the internal parts of the DVLM.
Figure 3:
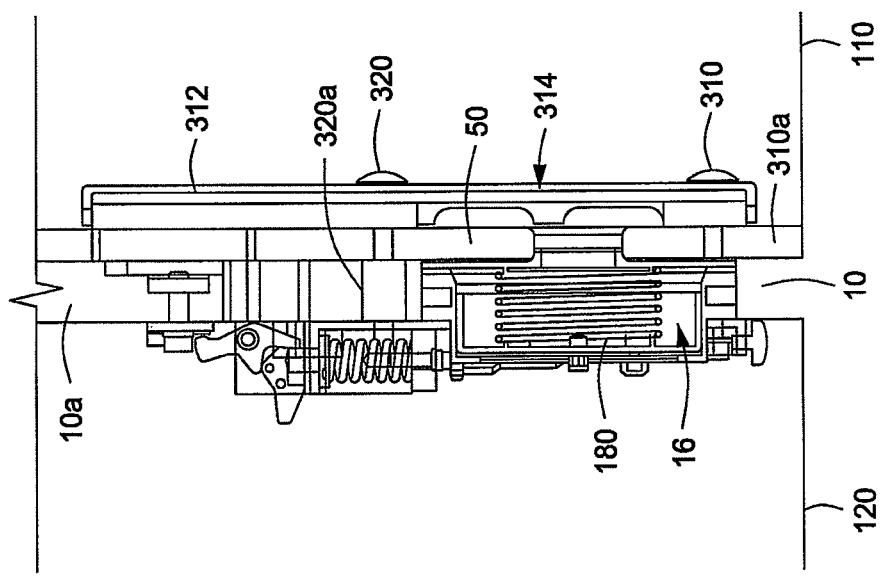
FIG. 3 is a side view of the DVLM in relation to the cabin and cockpit area.

Referring to FIGS. 2 and 3, after the flap 50 has been placed in the door 10, the cam 12 hooks are set by placing a flat blade screwdriver in the arm roller 14 slot and pushing cam hooks 12 in the locked position. Set screws (not shown) may be used in the cam hook 12 to control the flap 50 preload. A strike plate 32 is positioned adjacent with the cam hook 12 in order to accommodate the open and locked position.

In an event of sudden cabin decompression, the plunger (or piston) 16 is pulled towards the cabin 110, which opens the path for the tip blocks 18. Higher pressure in the cockpit 120 pushes the flap 50 towards the cabin 110 and when the force on the flap 50 is greater than the holding force of both latches 40, the flap 50 opens to the cabin 110.

The spring loaded plunger 16 may be required to be pushed towards the cabin 110 (by pressure gradient force or hand force from cockpit 120 side) so that the flap 50 can open. This feature prevents any unauthorized person to open the flap 50 from the cabin 110 side regardless of force applied (e.g., intrusion impact or ballistic penetration).

The spring 30 loaded latches 40 help reduce the friction force between the tip block 18 and the stop block 20 so that the plunger 16 has less moving restriction. In case the tip block 18 comes in contact with the stop block 20, the contact surface of the stop block 20 has been tapered. This tapered surface 20a causes a push down force on the stop block 20 by tip block 18.

For example, for an emergency exit, the cockpit crew can push the stop block 20 and rotate to lock it in place. Then the flap 50 can be kicked from the cockpit 120 side to open to the cabin 110.

Referring to FIGS. 2 and 3, various configurations of the parts of the DVLM 100 can be made, but an exemplary construction is shown. The plunger 16 can be connected and surrounded by a cylinder 65, accommodating motion in the transverse and rotational direction. The stop block 20 can be connected to the cylinder 65 and plunger 16.

The rotational and transverse movement of the plunger 16 can be limited by the interaction of the tip block positioned adjacent to but not touching the stop block 20. If there is a touching of the tip blocks 18 and the stop block 20, the friction can be reduced by a resilient member, such as a spring 30. The latches 40 can lock the DVLM 100 as shown above. All the above components can be mounted on the housing 80. The housing can include an upper portion 84 to cover the DVLM 100 and a lower portion 82 to accommodate the mounting of the components of the DVLM 100. Various fasteners can be used to mount the components within the DVLM or any one or more components can be integral to the housing 80.

Figure 4:
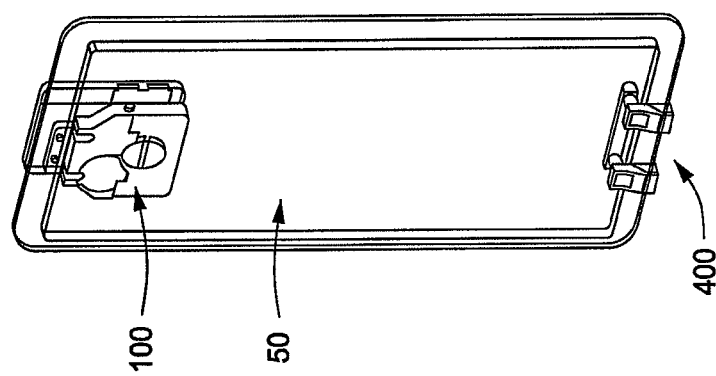
FIG. 4 is an illustration of the DVLM in relation to the flap.

Referring to FIG. 4, another optional method of opening the flap 50 is to make the lower hinge 400 removable so that by releasing a pin (not shown), the hinge 400 is detached and the flap 50 can be kicked open. If the plunger 16 is pushed in and rotated by mistake, the status indicator 22 provides visual warning to the pilots or other users in the cockpit side 120.

Referring back to FIG. 3, the DVLM 100 housing 80 is preferably mounted from the cockpit side 120 so that mounting screw threads 310a, 320a of the mounting screws 310 and 320 are not accessible from the cabin side 110. This prevents any individual from trying to remove the mounting screws 310 and entering the cockpit 120 area. Ballistic plates 312 may be used to prevent any ballistic penetration to the cockpit 120 area through the plunger 16 vent channel (not shown).

The functional preferences of the DVLM 100 can be, for example, the following properties. First, the DVLM 100, operates 100% mechanically under pressure gradient (e.g., 30 to 40 Mbar). Secondly, one can keep the flap 50 closed under minor pressure variations (e.g., pressure less than 10 mbar). Thirdly, the mechanism provides one to be unable to open from cabin side 110. Fourth, one has to withstand and keep the flap 50 closed during intrusion impact of, for example, 300 joules. Fifth, the mechanism provides a resistance to ballistic penetration at, for example, at least NIJ level IIIA (National Institute of Justice standard level IIIA) or better. The mechanism should also be tamper proof, easy to reset, not openable by any unintentional object bumping (e.g., pilot's suitcases, umbrellas, . . . ) in the cockpit 120, and provide visual indication, such as the status indicator 22, to pilots incase the device is unlatched.

The design parameters to satisfy above preferences are the following. A spring 180 loaded plunger (piston or bellows) 16 is used to provide 100% mechanical operation. The plunger 16 is preloaded by a spring to prevent premature triggering. A metallic latch and hinge 400 are used to prevent opening from cabin side 110.

Stop blocks 20 are used to resist any intrusion impact. Ballistic plates 312 are used to prevent any ballistic penetration. Critical screw threads (e.g., 310, 320) are not accessible from cabin side. The knob is easily rotated and blow out latches can be reset with a flat screw driver, for example. At least two operations are required to open the flap 50 (e.g., push/rotate knob and push flap). There is also included a status indicator 22.

Figure 5:
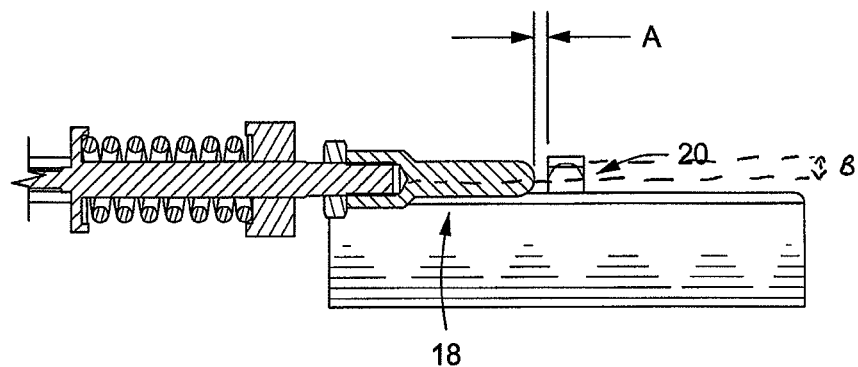
FIG. 5 illustrates the relation between the tip block and stop block of the DVLM.

Referring to FIG. 5, there is a controlled distance "A" between the tip block 18 and the stop block 20. This controlled distance "A" allows the stop block to move out of the way of tip block without colliding with each other during a rapid cabin decompression. This controlled distance "A" can be sustained under operation of the DVLM 100.

Figure 6:
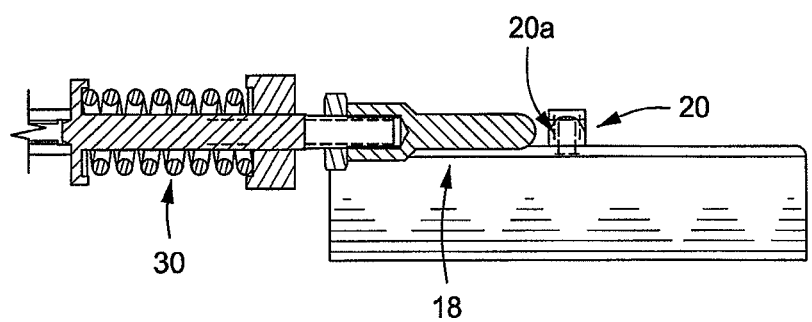
FIG. 6 is an illustration of the tip block.

Referring to FIG. 6, there is also a tapered feature 20a in the stop block 20. The tapered feature 20a for symmetry and ease of manufacture, can be located on both side of the stop block 20. In the case that the tip block 18 comes into contact with the stop block 20, this tapered feature 20a allows the tip block 18 to push the stop block out of the way so that the latch continues to open during the decompression event. Additionally, the tip blocks 18 can also have a rounded surface facing the stop block 18 so that when there is contact with the stop block 18, the contact would be a point contact only.

Figure 7:
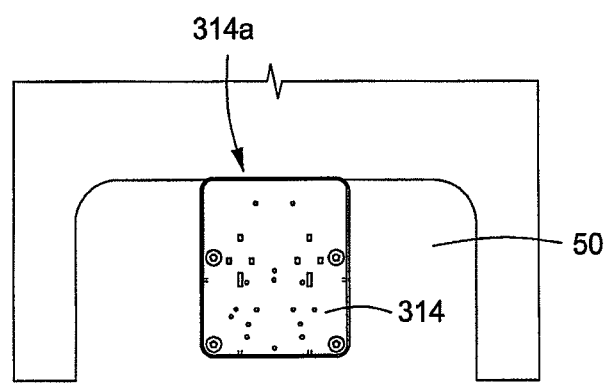
FIG. 7 is an illustration of the vent provided by the cover plate.

Referring to FIG. 7, there is a vent feature in the armor plate cover 314. The armor plate cover 314 is extended to above the flap 50 opening as seen by extended portion 314a of armor plate cover 314. This feature creates a vent in the armor plate cover 314, so that if an individual puts a suction cup or the like, on the armor plate cover 314 to try to pull the plunger 16 and gain access to the cockpit 120, air will vent out of the door 10 and a flap 50 opening seam and vacuum cannot be formed.

Figure 8:
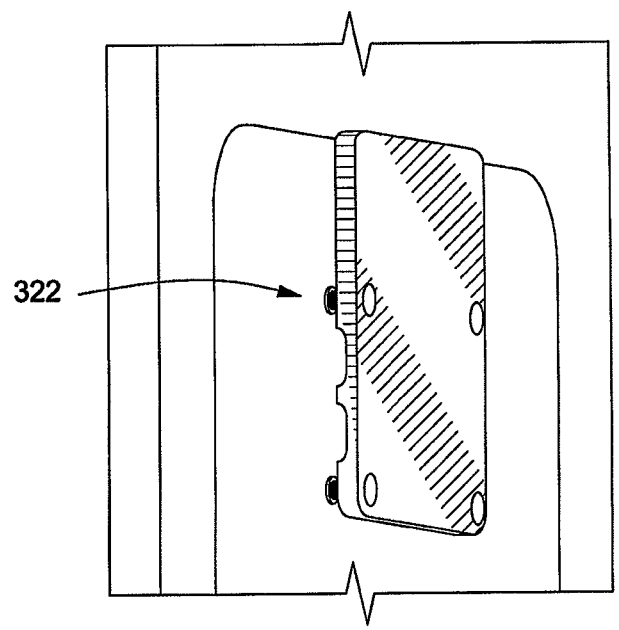
FIG. 8 is an illustration of dampening unit of the DVLM.

Referring to FIG. 8, there is a damping feature between armor plate 312 and flap 50. In case of intrusion or ballistic impact to the armor plate 312, compression or conical springs 322 are used to dissipate the energy and hence reducing the "g" loads on the plunger 16.

Figure 9:
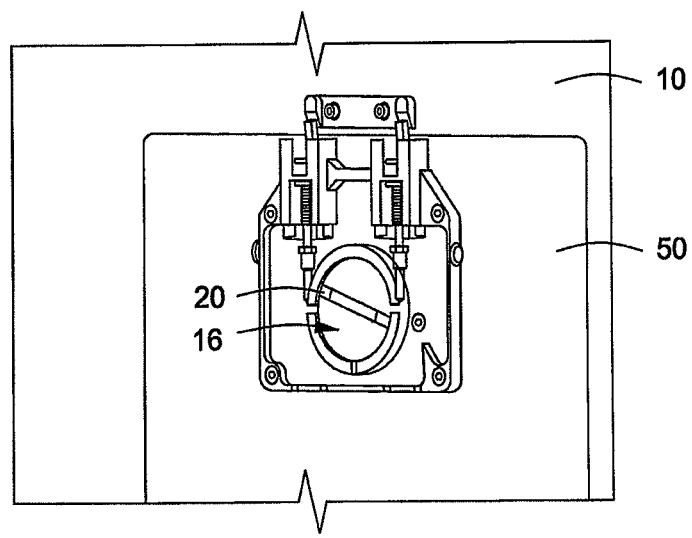
FIG. 9 illustrates an emergency exit of the DVLM.

Referring to FIG. 9, the DVLM 100 can also include an emergency exit. In case of the cockpit door 10 not being able to open during a crash landing, DVLM 100 can be mechanically over-ridden from the cockpit side and open to exit the cockpit 120. This is done by pushing the plunger 16 and rotating it so that the stop block 20 is out of the way of tip blocks 18. Then the flap 50 can be kicked towards the cabin 110 to open. Other types of overrides and emergency exit mechanism can also be incorporated in addition to or as an alternative to the pushing and rotating of the plunger 16.

Figure 10:
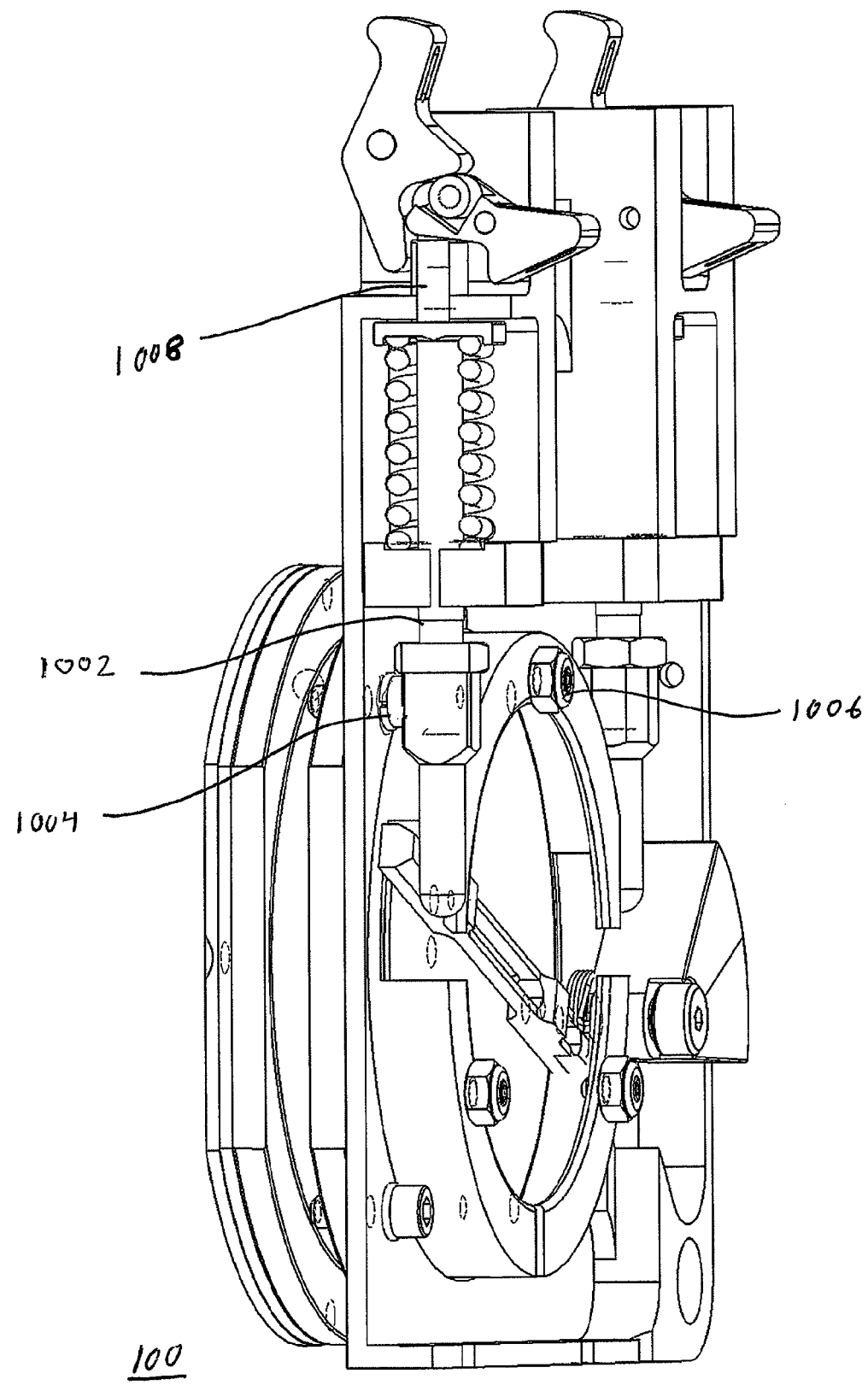
FIG. 10 illustrates a side view of the interaction of the tip blocks and the stop block.

Referring to FIG. 10 and FIG. 2, the interaction of the components of the DVLM 100 is described further in the following. When the latches 40 open, the shaft 1002 moves the distance "A", for example $1/200^{th}$ of an inch, then the latch 40 is open, so that stop block 20 cannot go to the $1/200^{th}$ of an inch, and so the door 10 does not open. Once the stop block 20 is in the way, the door 10 does not open. However, if the plunger 16 is pushed in and rotated in locked position, the plunger 16, when kicking the flap 50, the tip block will move the $1/200^{th}$ of an inch and the cam hooks 12 will pass over the arm roller 14 and latches 40 will open up.

The stop block 20 is connected to the plunger 16 with a couple of fasteners that hold the stop block 20. The tip blocks 18 are each attached to a shaft 1002, and jam nuts 1004 lock the tip blocks 18 in place. The shaft 1002 has, for example, helical windings to set the distance between the tip blocks 18 and the stop blocks 20. The jam nut 1004 is behind the tip block 18, and once the distance is selected, the distance is locked with the jam nut 1004 for the tip block 18 as gap "A". The shaft 1002 is basically threaded into the tip block to control the distance "A". The shaft 1002 itself is spring 30 loaded, which creates the spring force on the cam hooks 12.

Referring to FIG. 10, the DVLM 100 is in the open or unlocked position, where the pilot pushed the plunger 16 in and rotated it so that the flap 50 can be kicked, and the stop block 20 is out of the way of tip blocks 16. The cam hook 12 works with the arm roller 14, which has a roller integrated within. When the cam hook 12 is rotated clockwise as seen in FIG. 10, the cam hook 12 will push on the arm roller 14. The bottom of arm roller 14 is moved, as the cam hook 12 is rotated clockwise, when the flap 50 is opened. When the hook 50 rotates clockwise, the top part 1008 connected to shaft 1002 makes the springs 30 compress, and when the stop block 20 out of the way, and cam hooks 12 rotate enough and passes its climax, the latches 40 open. Once the stop block 20 is in the way, the gap is not enough allow to cam hooks 12 to pass, so latches 40 will not open.

There are two spring forces within the DVLM 100. There is the spring 180 in plunger 18 pushed by pressure, and spring 30 on shaft 1002 of the tip blocks 18, compressed by the cam hooks 12, from the pressure on the flap 50. Two different motions are being accommodated by the DVLM 100. When the plunger 16 moves slower than the tip block 18, then tip block 18 collides with the stop block 20 and not open. Therefore, one must make sure to have the right spring in the plunger 16 and shaft 1002 so that two forces are accommodated and where the motion of the plunger 16 fast enough to get out of the way of the tip blocks 18. The spring 30 on the tip blocks 18 provides time for the plunger 16 to move out of the way fast enough. If there are no springs on shafts 1002, then the flap 50 moves so fast, that the tip blocks would collide with stop block and the door 10 would not open up. The springs 30 and 180 get time for plunger 16 to move out of the way.

Additionally, as seen in FIGS. 5 and 10, the height "B" of the stop block can be controlled as related to the tip block 18. The height can be set by, for example, the fasteners 1006 to raise or lower the height on the stop blocks 20 in relation to the tip block 18 axis. The height "B" should set within a certain range. For example, one needs to avoid the circumstance of the position being too high, where the tip block would collide with the stop block during decompression. If the height "B" is too low, then if an intrusion attempt is made to the flap 50, the collision between the stop block 20 and tip block 18 may not occur. Therefore, the circumstances of the height "B" being too high or too low needs to be avoided. The same factors are taken into account for the distance "A" if it is too little or too much. The height "B" can be, for example, from the axis of the tip block 18 to the top of the stop block 20 as seen in FIG. 5.

Referring back to FIG. 2, the indicator 22 can be connected to the housing 80. For example, when the plunger 16 is pushed down and rotated, the stop block 20 can be in contact with the cam of the indicator 22, around, for example, the pivot of the indicator 22, to where it pushes the cam of the indicator 22 and changes the indicator 22 by rotating from green to red as indicating through color the state of the locking position.

Other alternative variations of the DVLM 100 can be constructed, including having the components shown in FIG. 2 in different positions or have components in addition to the components shown. Further, certain components can even be removed or replaced with a different part. For example, the plunger 16 can be located in another area with respect to the housing 80. The stop block 20 can be of a different construction in relation to the tip blocks 20. Instead of the stop block 20 and tip blocks 16, other types of devices can be used in order to provide similar function as shown above.

Additionally, the DVLM 100 can be mounted in a different configuration than that shown in the above example. The DVLM 100 can be mounted, for example, on a different surface in addition to the surfaces shown and can be located in a different position on the door 10.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A decompression latching system, comprising:
   a door assembly, separating first and second compartments, the door assembly including:
      a door having an opening,
      a movable flap attached to the door to seal the opening, and
      a strike plate attached to the door proximate to the opening; and
   a decompression latching mechanism attached to the flap proximate to the strike plate, the decompression latching mechanism including:
      a latch that cooperates with the strike plate and is configured to move, between a locked position and an unlocked position, the locked position preventing the flap from moving and the unlocked position allowing the flap to move,
      a spring loaded tip block abutting the latch, and
      a spring loaded plunger configured to move between a closed position and an open position, the plunger having first surface in fluid communication with the first compartment, a second surface in fluid communication with the second compartment, and a stop block disposed on the first surface to cooperate with the tip block,
      wherein when the plunger is in the closed position the stop block prevents the tip block from moving more than a predetermined distance, which prevents the latch from moving from the locked position to the unlocked position, and
      wherein when the plunger is in the open position the stop block does not prevent the tip block from moving more than the predetermined distance, which allows the latch to move from the locked position to the unlocked position.

2. The decompression latching system of claim 1, wherein the predetermined distance is about 0.005 inches.

3. The decompression latching system of claim 1, wherein the flap is attached to the door using a hinge.

4. The decompression latching system of claim 3, wherein the hinge includes a removable pin.

5. The decompression latching system of claim 1, wherein the latch includes a cam hook having a first surface and a second surface, the first surface being configured to abut the strike plate and prevent the flap from moving when the latch is in the locked position and to not abut the strike plate and allow the flap to move when the latch is in the unlocked position.

6. The decompression latching system of claim 5, wherein the latch further includes an arm roller having a first arm roller surface abutting the second surface of the cam hook, and a second arm roller surface abutting the tip block.

7. The decompression latching system of claim 6, wherein the tip block includes a first end abutting the first arm roller surface, and a rounded second end, and wherein the stop block includes a tapered end surface that cooperates with the rounded second end of the tip block.

8. The decompression latching system of claim 1, wherein the plunger translates between the closed position and the open position.

9. The decompression latching system of claim 8, wherein the decompression latching mechanism further includes a cylinder in which the plunger translates, the cylinder having an opening in a side wall to receive an end portion of the stop block to allow the plunger to rotate in the open position.

10. The decompression latching system of claim 9, further comprising a status indicator attached to the cylinder that cooperates with the stop block and indicates when the plunger is rotated in the open position.

11. The decompression latching system of claim 1, wherein the flap includes a vent channel to fluidly couple the second surface of the plunger to the second compartment.

12. The decompression latching system of claim 11, further comprising a ballistic plate attached to the flap that covers an opening of the vent channel into the second compartment.

* * * * *